United States Patent
Xirouchakis et al.

(10) Patent No.: US 11,917,667 B2
(45) Date of Patent: Feb. 27, 2024

(54) SYSTEMS AND METHODS FOR OFDM INTERFERENCE IMBALANCE MANAGEMENT

(71) Applicant: Sequans Communications SA, Colombes (FR)

(72) Inventors: Ioannis Xirouchakis, Colombes (FR); Elena Florian, Colombes (FR)

(73) Assignee: SEQUANS COMMUNICATIONS SA, Colombes (FR)

( * ) Notice: Subject to any disclaimer, the term of this patent is extended or adjusted under 35 U.S.C. 154(b) by 244 days.

(21) Appl. No.: 17/554,377

(22) Filed: Dec. 17, 2021

(65) Prior Publication Data

US 2023/0199817 A1 Jun. 22, 2023

(51) Int. Cl.
*H04W 4/00* (2018.01)
*H04W 72/541* (2023.01)
*H04L 5/00* (2006.01)

(52) U.S. Cl.
CPC ......... *H04W 72/541* (2023.01); *H04L 5/0048* (2013.01)

(58) Field of Classification Search
CPC .............. H04W 72/541; H04L 5/0048
See application file for complete search history.

(56) References Cited

U.S. PATENT DOCUMENTS

2004/0228417 A1* 11/2004 Kennedy .......... H04L 25/03159
  375/350
2017/0347340 A1* 11/2017 Haley ............... H04L 25/03343

FOREIGN PATENT DOCUMENTS

TW         201412165 A  *  3/2014  ............. H04J 11/00
WO    WO-2018031066 A1  *  2/2018

* cited by examiner

*Primary Examiner* — Thai D Hoang
(74) *Attorney, Agent, or Firm* — One LLP

(57) ABSTRACT

Disclosed are example embodiments of systems and methods for an interference imbalance manager (IIM). The method includes an outer loop that goes over the K subcarrier sets $k_i$ and an inner loop that goes over the M dominant intra-frequency cells that IC are performed on, for each subcarrier set $k_i$ the noise plus interference power estimate of that set is initialized by N by setting: $N(k_i)=N$. The method includes, for each subcarrier set $k_i$ the IIM determine when the pilots of each cell m collide with that subcarrier set. When there is no collision, the interference plus noise of that set $N(k_i)$ is not adjusted. When there is a collision the interference plus noise of that set $N(k_i)$ is adjusted by removing the power contribution $E_m$ of that cell by applying the correction: $N(k_i)=N(k_i)-E_m$. The method includes looping over all considered cells M and when all adjustments are complete to $N(k_i)$ for subcarrier set $k_i$ the program provides the adjusted $N(k_i)$ output and exits the m loop.

11 Claims, 6 Drawing Sheets

SYSTEMS AND METHODS FOR OFDM INTERFERENCE IMBALANCE MANAGEMENT

TECHNICAL FIELD

The disclosure relates generally to the field of wireless communication, specifically and not by way of limitation, some embodiments are related to OFDM interference imbalance management.

BACKGROUND

One well-known signal processing approach for the quality improvement of communication systems in general is interference cancellation (IC). With IC the quality of the received signal, in terms of Signal-to-Interference-plus-Noise Ratio (SINR), is improved by estimating and subtracting known interference from that signal.

In the case of systems using Orthogonal Frequency Division Multiplexing (OFDM) like Long Term Evolution (LTE) and New Radio (NR), where the transmitted signal is a combination of symbols modulating a number of different orthogonal frequency components (subcarriers), the known interference may occupy only a subset of those subcarriers. For example, subcarriers may be occupied by pilot symbols and not data symbols. Thus, IC may be applied only on those subcarriers. IC may be applied only on the subcarriers because the value of pilot symbols is known to the receiver and can be eventually subtracted.

When IC is performed only on a subset of subcarriers while in other subcarriers interference remains intact, an interference imbalance between the two sets of OFDM frequency components may be created. In the situations when there is an interference imbalance between the two sets of OFDM frequency components, there is no single SINR value that describes the channel quality of both of the sets of subcarriers. Having no single SINR value that describes the channel quality of both of the sets of subcarriers creates issues at the receiver when there is a need to provide an accurate SINR estimate per subcarrier, or a set of subcarriers, or an SINR estimate that reflects the average SINR of all subcarriers.

For example, a common approach is to scale Log Likelihood Ratios (LLRs) by the corresponding SINR prior to decoding. In some examples Channel Quality Indicator (CQI), Radio Resource Management (RRM), and Radio Link Monitoring (RLM) metrics are derived as a function of the subcarriers' SINR.

The problem of not having an SINR estimate that reflects the average SINR of all subcarriers becomes even more complicated when considering that the SINR estimator at the receiver may be completely unaware of any applied IC, e.g., when no IC is performed on the subcarriers where the SINR was estimated. In the case where no IC is performed on the subcarriers where the SINR was estimated, the estimated SINR is under-evaluating the actual average SINR of the complete set of subcarriers. The SINR estimation at the receiver occurs only using subcarriers where IC has already occurred. In this case, the estimated SINR is over-evaluating the average SINR of the complete set of subcarriers.

In summary, the receiver performance in terms of signal demodulation, link maintenance, and measurement reporting may be negatively affected when the interference imbalance between OFDM subcarriers due to IC is not managed properly. In the 3GPP standards, the application of interference cancellation as, e.g., presented in 3GPP TR 36.363 "Study on Cell-specific Reference Signals (CRS) interference mitigation for homogenous deployments of LTE," V12.0.0 (2013-12) does not address the interference imbalance issue and hence does not provide any solution to the interference imbalance issue.

SUMMARY

One general aspect includes systems and methods for an interference imbalance manager (IIM). The method includes an outer loop that goes over the K subcarrier sets $k_i$ and an inner loop that goes over the M dominant intra-frequency cells that IC are performed on, for each subcarrier set $k_i$ the noise plus interference power estimate of that set is initialized by N by setting: $N(k_i)=N$. The method includes, for each subcarrier set $k_i$ the IIM determine when the pilots of each cell m collide with that subcarrier set. When there is no collision, the interference plus noise of that set $N(k_i)$ is not adjusted. When there is a collision the interference plus noise of that set $N(k_i)$ is adjusted by removing the power contribution $E_m$ of that cell by applying the correction: $N(k_i)=N(k_i)-E_m$. The method includes looping over all considered cells M and when all adjustments are complete to $N(k_i)$ for subcarrier set k the program provides the adjusted $N(k_i)$ output and exits the m loop.

The features and advantages described in the specification are not all-inclusive. In particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

Figure 1:
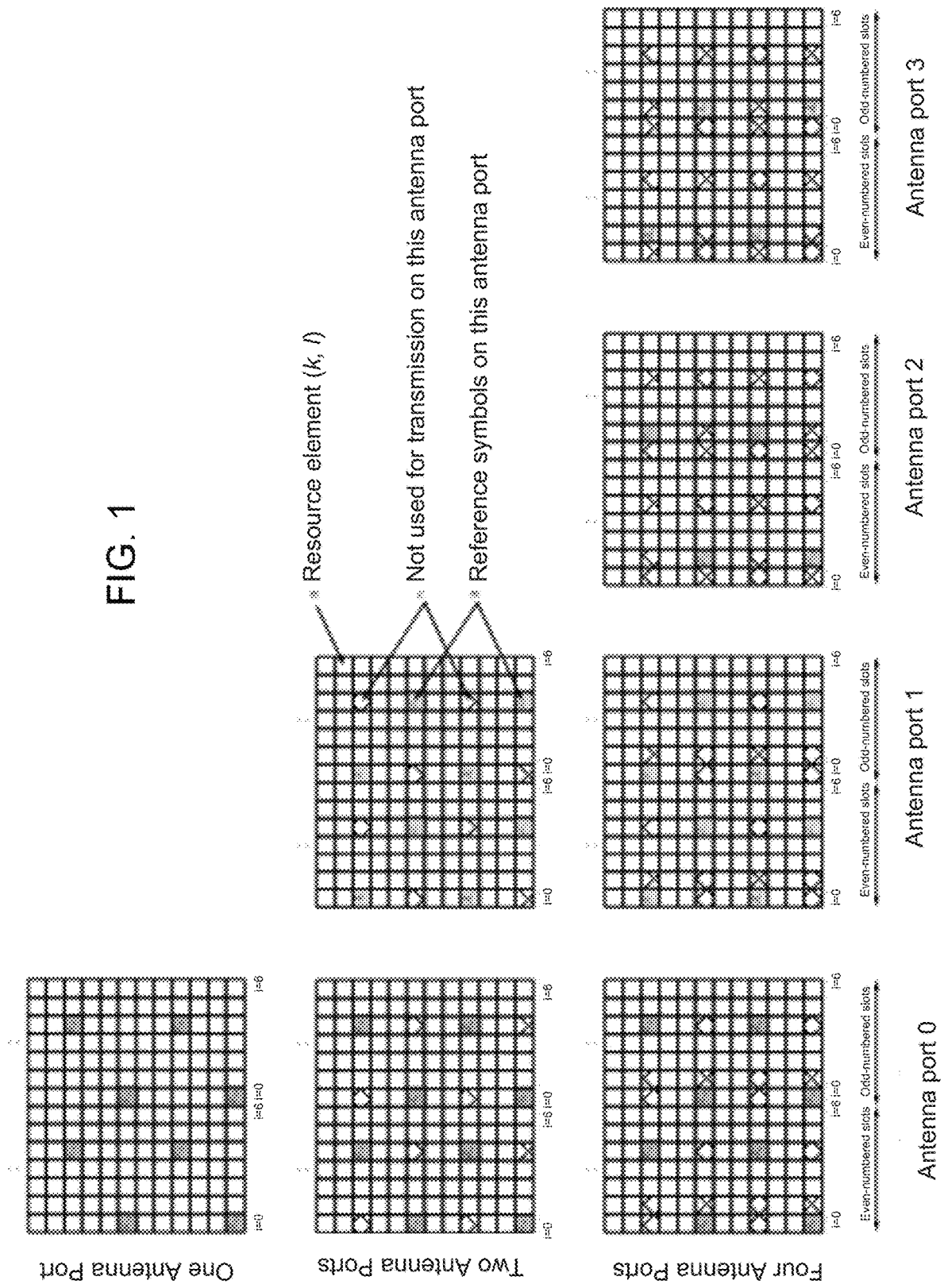
FIG. 1 is a diagram illustrating mapping of cell-specific reference signal (CRS) within a resource block for a normal cyclic prefix and a y-shift equal to 0.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

The detailed description set forth below in connection with the appended drawings is intended as a description of configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In one aspect, an example embodiment provides a method for interference imbalance management (IIM) in an OFDM receiver performing interference cancellation. One example embodiment may use the example of an LTE receiver performing interference cancellation on Cell Reference Signals (CRS) (see 3GPP TR 36.363, "Study on Cell-specific Reference Signals (CRS) interference mitigation for homogenous deployments of LTE," V12.0.0 (2013-12)), but the solution may be applied in any other OFDM system applying IC on known pilot symbols similar to CRS. Other examples may be NR, and many IEEE 802 variations (e.g., 802.11ac). Some examples of other types of signals similar to CRS in LTE are the Primary Synchronization Signal (PSS), the Secondary Synchronization Signal (SSS), the Physical Broadcast Channel (PBCH). The systems and methods described herein may be applied when an IC method is used on any type of signal that the receiver has prior knowledge of, and/or when the receiver can resolve the signal's value and placement in the received signal.

Some example embodiments use an example of a Single-Input Single-Output (SISO) antenna configuration to illustrate the systems and methods described herein, however, the systems and methods described herein may also be applied to Multiple-Input Multiple-Output (MIMO) systems, or other transmission systems and/or other antenna systems.

The CRS interference may originate from CRS transmissions of neighbour cells on the same operating frequency as a serving cell. The neighbour cells may also be referred to as intra-frequency cells. The serving cell may be a cell that a user equipment (UE) has connected to for providing communication services to a user of the UE. Cell Reference Signals Interference Cancellation (CRS-IC) may be the interference cancellation of those CRS transmissions of intra-frequency cells.

CRS may be broadcast signals (e.g., signals intended for all UEs of the same cell), transmitted by LTE cells to allow UE procedures such as channel estimation, channel state information (CSI) estimation, RRM measurements (RSRP/RSSI/RSRQ estimation), RLM, and others (e.g., timing and frequency offset/Doppler estimations, etc.). In one example, CRS correspond to up to 4 different antenna ports (APs) in order to allow the utilization of multiple antenna techniques. Cells may transmit CRS in every subframe, within the entire bandwidth, in the same time and frequency positions, except in the following cases: (1) a subframe is a TDD uplink (UL) subframe (in this case the cell does not transmit any CRS), (2) a subframe is a TDD special subframe (in this case the cell transmits CRS within the DwPTS region of the subframe), (3) a subframe is a MBSFN subframe (in this case the cell transmits CRS within the control region of the subframe), and (4) the cell supports and applies Rel-15 network-based CRS interference mitigation (e.g., network CRS muting) features.

The density of the CRS within a subframe depends on which antenna port it belongs to. There are up to four CRS antenna ports: 0, 1, 2, and 3. The exact number of antenna ports transmitted by a cell (i.e., 1, 2, or 4) is determined by the UE during the PBCH detection procedure (Table 5.3.1.1-1 of 3GPP TS 36.212, "Multiplexing and channel coding," Rel-15, V15.7.0 (2019-09)). CRS of the same antenna port are frequency separated by 6 resource elements. Additionally, for normal cyclic prefix (normal CP) cells: CRS of antenna ports 0 and 1 are transmitted in OFDM symbols 0, 4, 7, and 11. CRS of antenna ports 2 and 3 are transmitted in OFDM symbols 1 and 8. For extended cyclic prefix (extended CP) cells: CRS of antenna ports 0 and 1 are transmitted in OFDM symbols 0, 3, 6, and 9. CRS of antenna ports 2 and 3 are transmitted in OFDM symbols 1 and 7.

The exact position of the CRS depends on the physical cell identity of the cell (PCID) according to the function:

$$v_{shift} = N_{ID}^{cell} \bmod 6 \tag{1}$$

The case of 1, 2, and 4 antenna ports with normal cyclic prefix and $v_{shift}=0$, is depicted in FIG. 1 is a diagram illustrating mapping of CRS within a resource block for a normal cyclic prefix and a vshift equal to 0 (showing one resource block). For more details on CRS please refer to 3GPP TS 36.211, "Evolved Universal Terrestrial Radio Access (E-UTRA); Physical channels and modulation", Rel. 15.13.0.

OFDM SINR Estimator

FIG. 1 is a diagram illustrating mapping of CRS within a resource block for a normal cyclic prefix and a $v_{shift}$ equal to 0. Typically, the SINR estimator of an OFDM receiver may perform the estimation in the frequency domain, e.g., after performing a Fast Fourier Transform (FFT), by processing the received subcarriers at the position of the CRS and providing an SINR average over the total number of CRS used for the processing. For a single antenna port system, for a receiver not performing CRS-IC, and for a receiver performing the SINR estimation prior to CRS-IC, the average SINR $\bar{\gamma}$ is respectively given by the expressions of (2), (3), and (4).

$$\bar{\gamma} = \frac{E_s}{N_0 + I} \tag{2}$$

$$\bar{\gamma} = \frac{E_s}{N_0 + \sum_{\substack{j=0 \\ j \neq s}}^{N-1} E_j} \tag{3}$$

$$\bar{\gamma} = \frac{E_s}{N_{oc} + \sum_{\substack{m=0 \\ m \neq s}}^{M-1} E_m} \tag{4}$$

where $N_0$ is the thermal noise power, I is the sum of the intra-frequency cell interference power, M are the dominant interfering cells from the set of total N−1 interfering cells, $N_{oc}$ collects thermal noise and all interference from the rest of the non-dominant N−M−1 cells, $E_s$ is the serving cell average subcarrier power, also referred to as Reference Signal Received Power (RSRP), and $E_j$ are the interference cells average subcarrier signal power at the UE within a network of N cells, respectively. By grouping the non-dominant cells and the thermal noise within $N_{oc}$ it may be assumed that the signal contributions from the non-dominant cells have no outstanding interference, e.g., they contribute to the noise floor.

Notice that usually the dominant cells are identified and tracked by the UE for potential hand-over or cell re-selections, e.g., their powers $E_m$ are measured by the UE. $E_s$ and $N_0+I$ may also be measured by a typical OFDM receiver, however, some examples described herein will not focus on these estimation methods. It will be understood that other embodiments may use these estimation methods, however. In some embodiments, the IIM may adjust the noise plus interference according to the applied IC. Subsequent to the adjustment of the IC, the receiver may use alternative metrics other than the SINR in the various procedures (e.g., RLM, CQI, RRM).

In an aspect, equations (2), (3), and (4) assume that the SINR estimation is performed prior to the application of a CRS-IC algorithm, e.g., equations (2), (3), and (4) may reflect the SINR before CRS-IC. In other aspects, the SINR estimation may be performed at other times.

A CRS-IC algorithm may be performed to remove the CRS interference of the dominant intra-frequency cells. When the CRS-IC algorithm is performed to remove the CRS interference of the dominant intra-frequency cells, the UE may need to differentiate between (1) subcarriers where IC was performed and (2) subcarriers where IC was not performed.

An example may be the case where all M−1 dominant cells have colliding CRS, e.g., the positions of the CRS may be common, and CRS-IC may be performed at the receiver. After CRS-IC the interference contributions of the dominant cells may be removed but only at the subcarrier positions of the intra-frequency cell CRS. For those positions (e.g., denoted as subcarrier set $k_0$) the post CRS-IC SINR $\gamma_{k_0}'$ may be improved. For the other subcarrier positions (e.g., denoted as subcarrier set $k_1$) the post CRS-IC SINR $\gamma_{k_1}'$ remains the same as before. Expressions (5) and (6) of the post CRS-IC SINRs of subcarrier sets $k_0$ and $k_1$ show the interference imbalance between the two set of subcarriers.

$$\gamma_{k_0}' = \frac{E_s}{N_{oc}} \tag{5}$$

$$\gamma_{k_1}' = \frac{E_s}{N_{oc} + \sum_{\substack{m=0 \\ m \neq s}}^{M-1} E_m} \tag{6}$$

In an example, CRS of different intra-frequency cells may not necessarily collide. To be able to describe the post CRS-IC of a subcarrier set $k_i$ a more generic expression of (7) may be used.

$$\gamma_{k_i}' = \frac{E_s}{N_{oc} + \sum_{\substack{m=0 \\ m \neq s}}^{M-1} b_m E_m} \tag{7}$$

where $b_m=1$ if the CRS of cell m is not colliding with the subcarrier set $k_i$, e.g., CRS interference is not removed within set $k_i$, and $b_m=0$ otherwise, e.g., when CRS interference is removed within set $k_i$.

However, expression (7) reflects the actual post-IC SINR of the different subcarrier sets. In an example embodiment, the UE may measure the SINR at the position of the serving cell pilots (CRS for LTE). The pilots may be located in one of the subcarrier sets $k_i$. The pilots being located in one of the subcarrier sets $k_i$ means the SINR estimator based on CRS may only describe the post-CRS-IC SINR of only a single subcarrier set. The SINR estimator cannot measure the SINR of other subcarrier sets nor the average SINR of all subcarriers. This is also part of the interference imbalance issue that an example embodiment may solve.

In some example embodiments, the proposal introduces the concept of an interference imbalance manager (IIM) that has the task of providing the correct post-IC SINR for different subcarriers sets and for the average post-IC SINR of all subcarriers for whatever purpose this is needed for (decoding, CQI, RRM, RLM, etc.). An example embodiment may be description using the example of interference cancellation in the context of CRS-IC in LTE using a single antenna port, but other example embodiments may be generalized for any OFDM communication system using pilots with single or multiple antenna ports.

In an example embodiment, the first task of the IIM may be to categorize the subcarriers to a number of subcarrier sets, where each subcarrier of the same set can be described by the same post-IC SINR expression. In the case of CRS-IC this depends on the number of the dominant intra-frequency cells that are removed by CRS-IC and the position of their CRS. However, there is a finite number of subcarrier sets that can have different SINRs.

For example, in LTE there can be only up to seven sets of subcarriers that experience different interference levels, hence different SINRs. This may happen when there are six dominant intra-frequency cells that CRS-IC is applied to and each of them have different CRS positions according to expression (1). Thus, six subcarrier sets will have a different level of interference reduction and one set will have no interference reduction, e.g., a total of seven subcarrier sets with different interference power levels.

Figure 2:
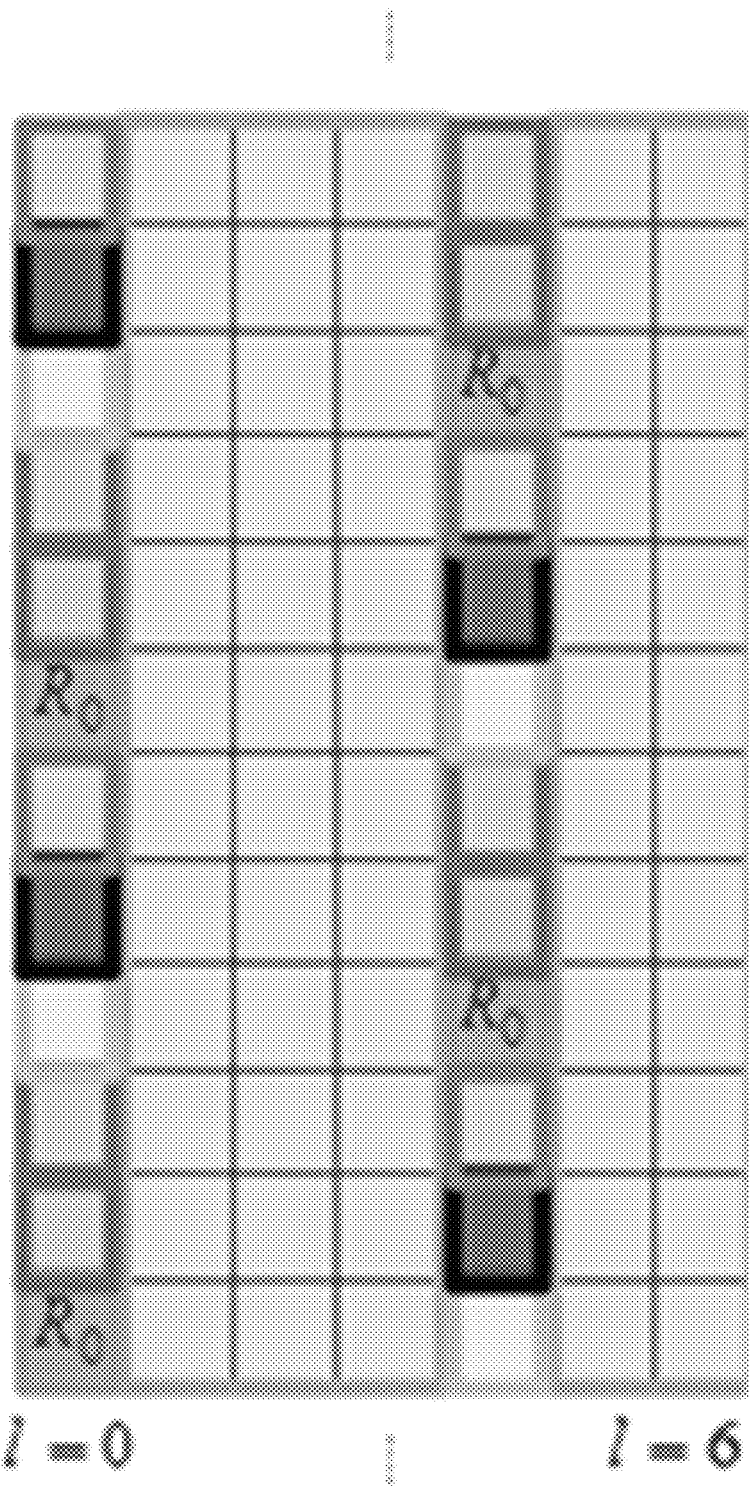
FIG. 2 is a diagram illustrating a maximum of seven different subcarrier sets in an Long Term Evolution (3GPP 4G technology) (LTE) resource block within a slot that may experience different interference levels.

FIG. 2 is a diagram illustrating a maximum of seven different subcarrier sets in an Long Term Evolution (3GPP 4G technology) (LTE) resource block within a slot that may experience different interference levels. FIG. 2 depicts these seven different subcarrier sets within an LTE resource block within slot #0 using a different color for each subcarrier set. In the illustrated example, this pattern repeats for all resource blocks within the same slot and for all resource blocks for slot #1. Notice that for OFDM symbol indices l=1, 2, and 3 there is no interference reduction because these symbols do not interfere with the CRS of any intra-frequency cell.

Table 1 provides the exact subcarrier and symbol indices of each subcarrier set $k_i$.

TABLE 1

Definition of the IIM subcarrier sets specific to an LTE resource block of a slot.

| Subcarrier set $k_i$ | {[subcarrier indices k], [symbol indices l]} |
| --- | --- |
| $k_0$ | {[0, 6], [0]}, {[3, 9], [4]} |
| $k_1$ | {[1, 7], [0]}, {[4, 10], [4]} |
| $k_2$ | {[2, 8], [0]}, {[5, 11], [4]} |
| $k_3$ | {[3, 9], [0]}, {[0, 6], [4]} |
| $k_4$ | {[4, 10], [0]}, {[1, 7], [4]} |
| $k_5$ | {[5, 11], [0]}, {[2, 8], [4]} |
| $k_6$ | {[0, . . . , 11], [1, 2, 3, 5, 6]} |

Going back to expression (7) we observe that the nominator $E_s$ is the average power of the serving cell and is interference independent. Thus, the IIM does not have to manage the SINR but only the SINR's denominator $N_0+I$ which represents the noise-plus-interference power. This observation reveals that interference imbalance management may be localized only at the noise-plus-interference power estimator which simplifies things to a high degree. In an example embodiment, the IIM task may be to receive the output of $N_0+I$ and adjust the output of $N_0+I$ so that each of the subcarrier sets has a proper representation of their interference-plus-noise power $N(k_i)$.

Figure 3:
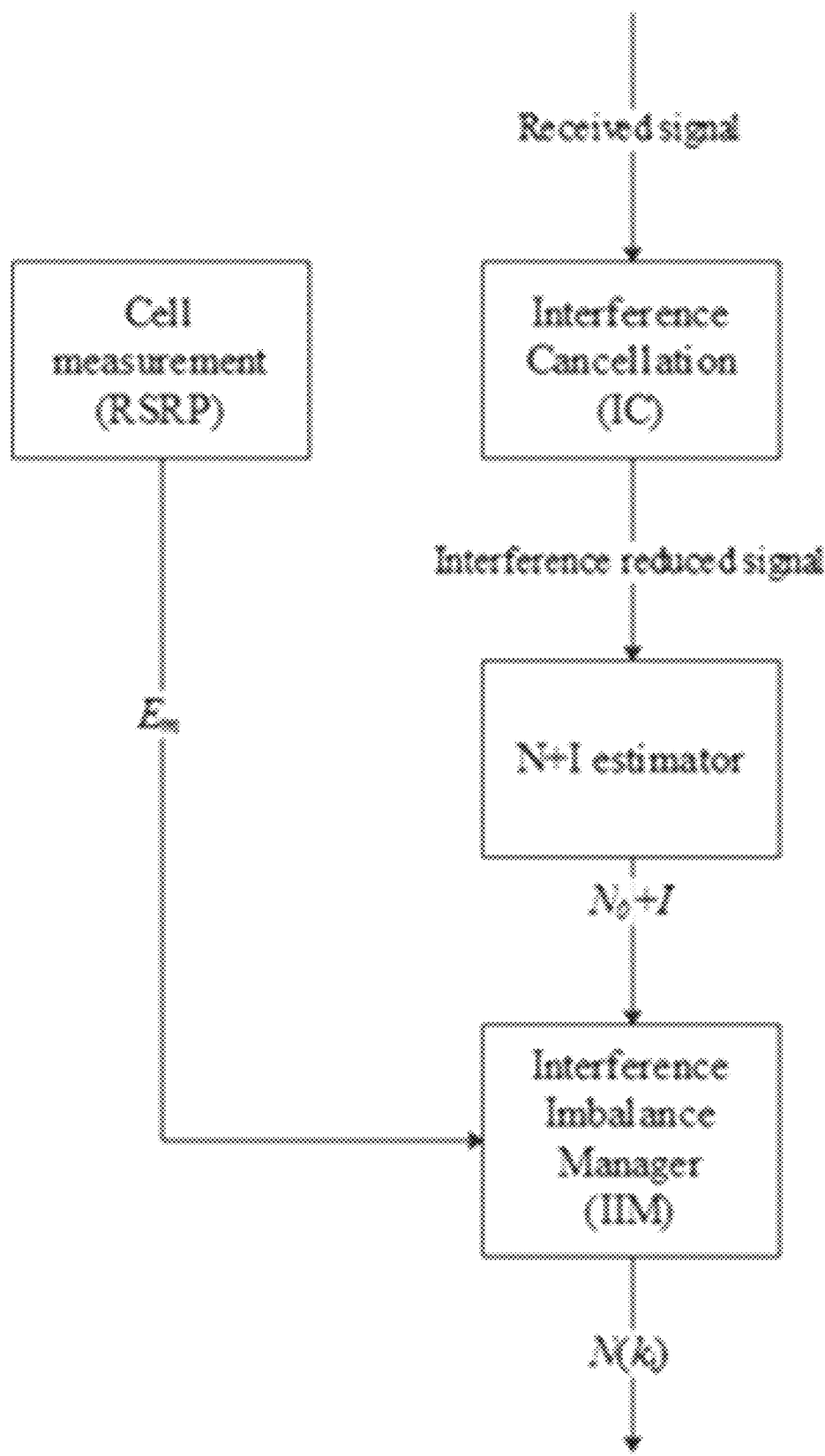
FIG. 3 is a diagram illustrating a signal flow for a user equipment (UE) implementing N+I estimator post interference cancellation (IC).

FIG. 3 is a diagram illustrating a signal flow for a user equipment (UE) implementing N+I estimator post IC. As illustrated in FIG. 3, the cell measurement RSRP may provide an input $E_m$ to the IIM. The received signal may be routed through the interference cancellation (IC) which may output an interference reduced signal as illustrated in FIG. 3.

The interference reduced signal maybe an input to an N plus I estimator which may output $N_0+I$ to the IIM. The IIM may take $E_m$ and $N_0+I$ as inputs and output $N(k_i)$.

Figure 4:
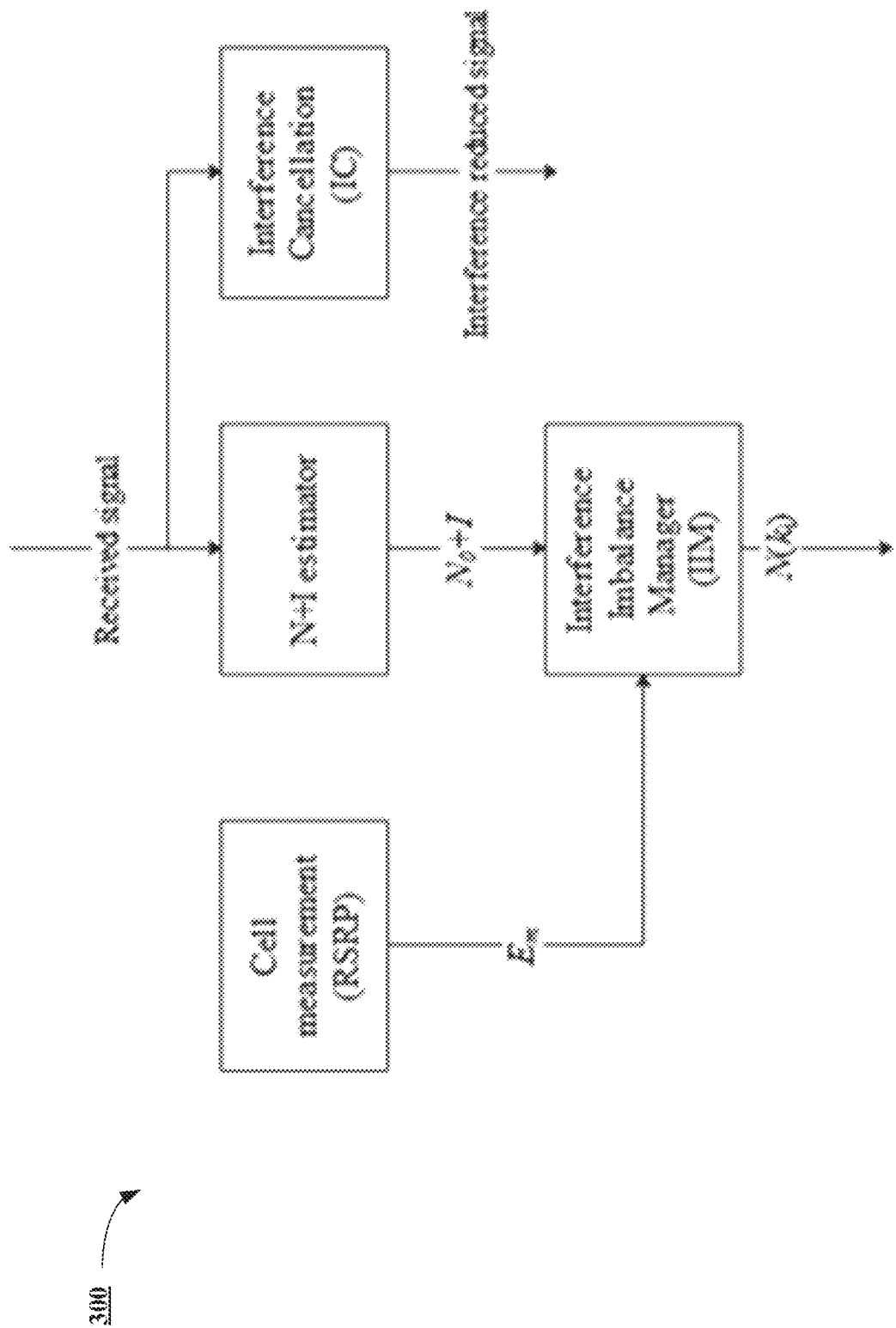
FIG. 4 is a diagram illustrating a signal flow for a UE implementing N+I estimation prior to IC.

FIG. 4 is a diagram illustrating a signal flow for a UE implementing N+I estimation prior to IC. As illustrated in FIG. 4, the cell measurement RSRP may provide an input $E_m$ to the IIM. The received signal may be routed through the interference cancellation (IC) which may output an interference reduced signal as illustrated in FIG. 4. Furthermore, the received signal may be routed through the N+I estimator which may output $N_0+I$ to the IIM. The IIM may take $E_m$ and $N_0+I$ as inputs and output $N(k_i)$.

The behavior of the IIM block depends on whether the estimation of $N_0+I$ is done prior to the application of IC or after the application of IC, depending on the UE implementation. The signal flows for the two implementation choices are illustrated in FIG. 3 and FIG. 4, respectively. The IIM should be aware of the implemented approach in order to apply the correct interference corrections.

In one example embodiment, when $N_0+I$ estimation is done post IC (see FIG. 3), the signal going into the $N_0+I$ estimator may remove the $E_m$ interference contributions. When the CRS of any dominant intra-frequency cells happen to collide with the CRS of the serving cell (e.g., the subcarrier set that the UE uses to estimate $N_0+I$), the calculated interference plus noise may not be included in the interference contribution(s) of the colliding cell(s) because these contributions may have been removed from IC before the $N_0+I$ estimation. Thus the $N_0+I$ output does not represent the noise plus interference of other subcarrier sets. In this case, the IIM may have to add back the corresponding interference contribution(s).

In another example embodiment, when $N_0+I$ estimation is done prior to IC (see FIG. 4), there may be no interference reduction yet in any of the subcarrier sets $k_i$, including the one used for $N_0+I$ estimation. This may mean that the $N_0+I$ estimator using the subcarrier set where the serving cell CRS are positioned may measure an interference plus noise level that describes all the subcarrier sets as shown in the denominator of expression (4). The IIM may have to adjust the interference power of each subcarrier set according to the estimated power $E_m$ of the dominant interfering cells m that may be removed from IC and have colliding CRS with a specific subcarrier set in order to produce accurate noise plus interference estimates N(k) for each subcarrier set $k_i$ according to expression (7).

Figure 5:
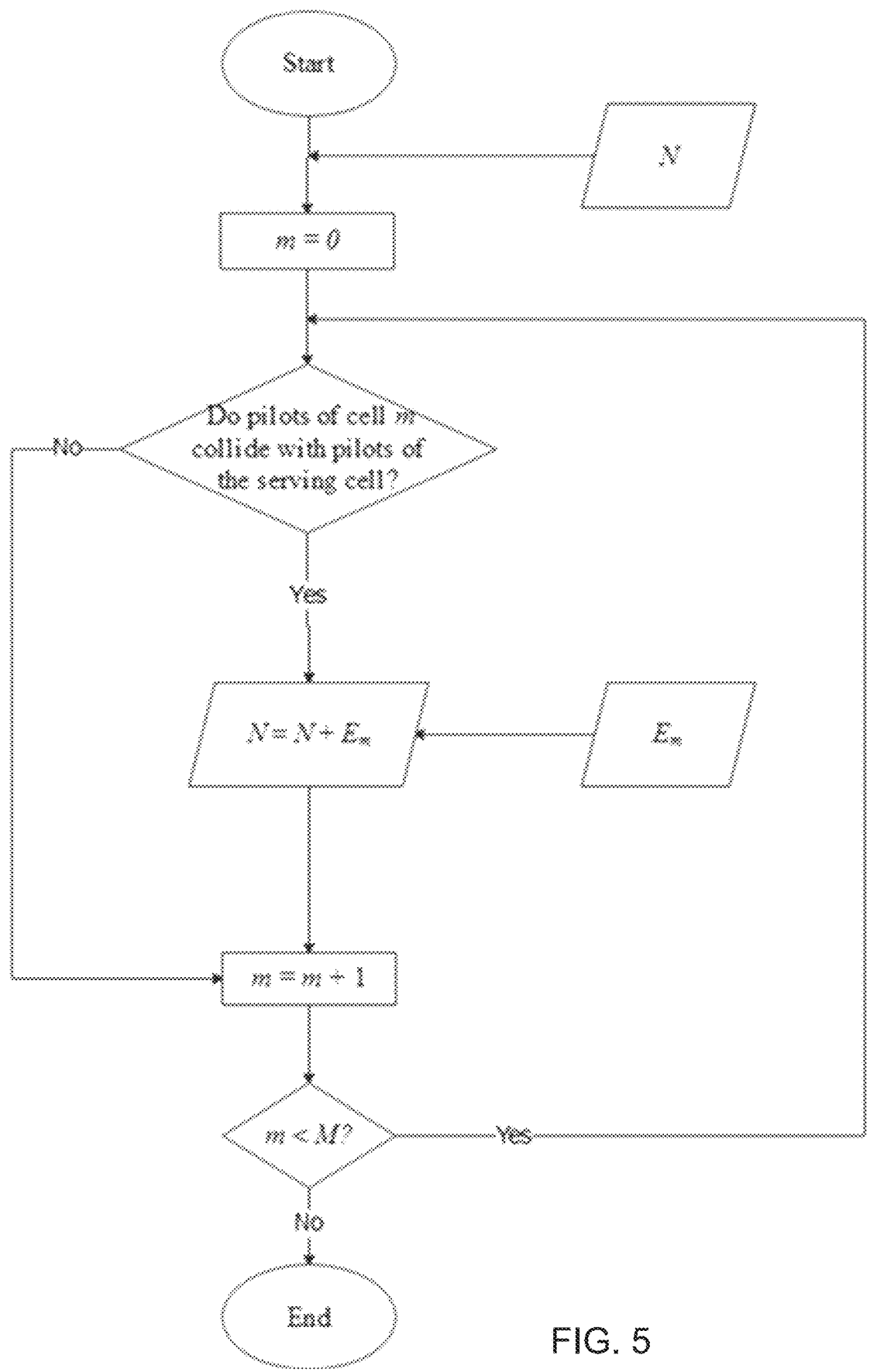
FIG. 5 is a flow diagram illustrating an example method of Interference Imbalance Manager (IIM) in accordance with the systems and methods described herein.
Figure 6:
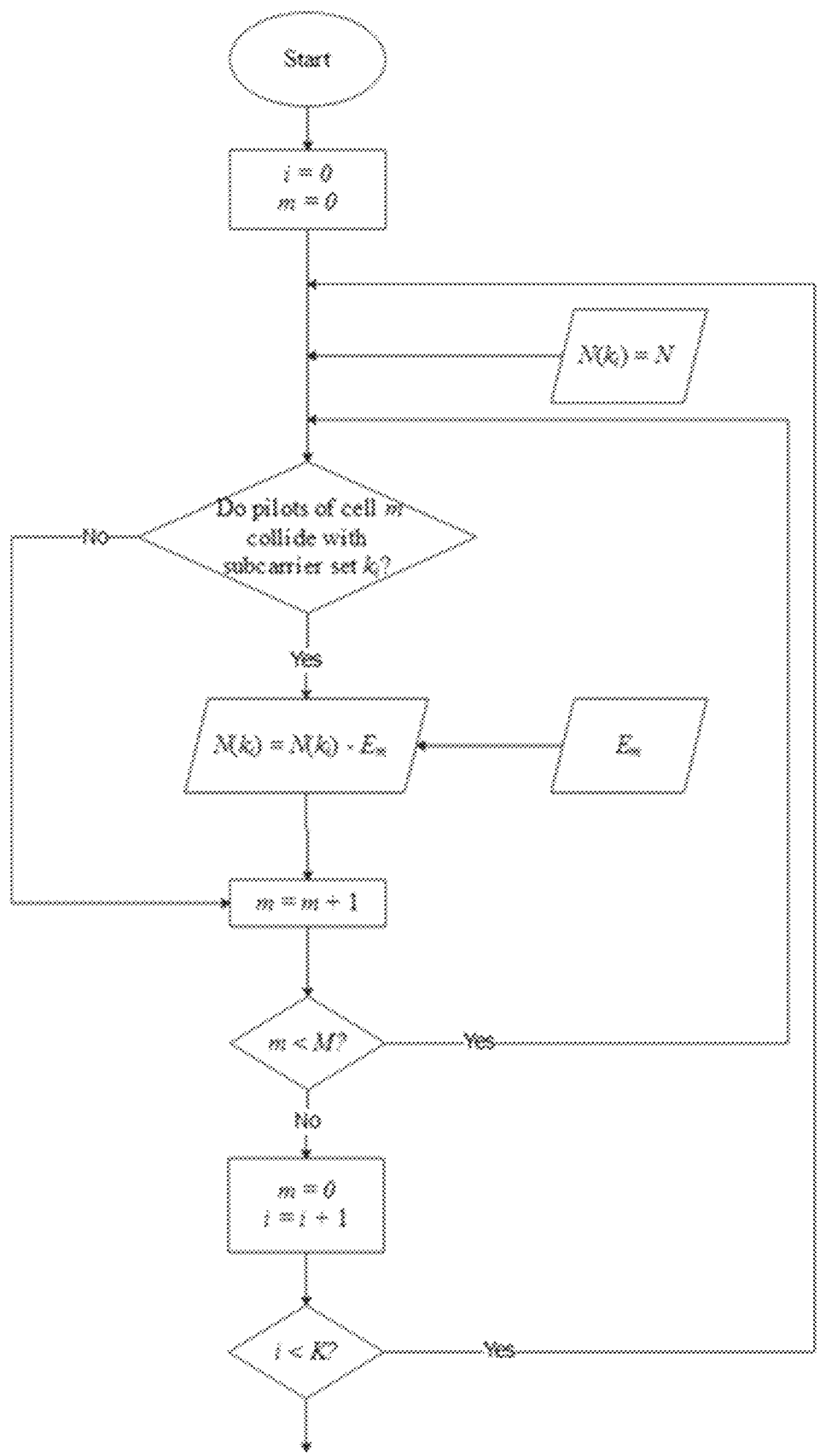
FIG. 6 is another flow diagram illustrating another example method of IIM.

FIG. 5 is a flow diagram illustrating an example method of an Interference Imbalance Manager (IIM) in accordance with the systems and methods described herein. FIG. 6 is another flow diagram illustrating another example method of an IIM. Accordingly, FIGS. 5 and 6 present two flowcharts of the Interference Imbalance Manager (IIM). In an example embodiment, the flow-chart of FIG. 5 may be executed when IC has been applied prior to the $N_0+I$.

Also notice that $k_i$ indicate the subcarrier sets. For LTE these are specified in Table 1, where 0≤i<K, K=7. $E_m$ indicate the RSRP of the total M measured dominant intra-frequency cells, where 0≤m<M The number M depends on how many cells the UE can detect, measure and cancel within a single Transmission Time Interval (TTI). N indicates the noise plus interference power measured by the corresponding estimator using the serving cell pilot symbols (CRS for LTE) using one of the subcarrier sets depending on expression (1). The noise plus interference expression $N(k_i)$ of each subcarrier set k are initialized by the same noise plus interference value N that the $N_0+I$ have estimated.

In an example embodiment, the IIM may (optionally) perform the steps illustrated in the flow chart a of FIG. 5. As illustrated, FIG. 5 may be an optional algorithm that, in one example, may need to be applied when the IC has been applied prior to the $N_0$+I estimator. The algorithm of FIG. 5 may have the task to add back to the interference plus noise estimate N calculated on the subcarrier set carrying the serving cell pilots any removed interference power due to the application of IC. This step may be performed in order to allow N to go back to including all interference that can be later on removed by step two depending on the position of each subcarrier set and the position of the canceled pilots of each dominant intra-frequency cell. The IIM algorithm a may include one program loop over the M dominant intra-frequency cells that IC was performed.

In an example embodiment, before entering the loop, the algorithm may have access to the output N which may be the noise plus interference estimate provided by the $N_0$+I estimator. Notice that, in an example, N does not include the interference power of cells that their pilots collide with the serving cell pilots because this interference may have already been already cancelled. When entering the m loop the algorithm may check if the pilots of cell m collide with the serving cell pilots. For LTE this may be done by checking when the following condition is true:

$$v_{shift,s} = v_{shift,m}$$

where s indicates the serving cell and $v_{shift}$ is given by expression (1) which defines the frequency position of each cell's CRS pilots.

When the pilots do not collide then the lack of a collision means interference of the pilots of cell m was not removed and adjusting N is not necessary. When the pilots collide then the collision means interference of the pilots of cell m was removed from N and this power needs to be added back by applying the correction:

$$N = N + E_m$$

In an example embodiment, the algorithm may loop over all considered cells M and when all adjustments are done the program exits.

In an example embodiment, step two may be perform as illustrated in the flowchart of FIG. 6. The IIM algorithm of FIG. 6 may include two program loops, an outer program loop and an inner program loop. In an example embodiment, the outer loop goes over the K subcarrier sets $k_i$ and the inner loop goes over the M dominant intra-frequency cells that IC was or will be performed, e.g., depending on when IC is applied prior or post $N_0$+I estimator. For each subcarrier set $k_i$ the noise plus interference power estimate of that set is initialized by N by setting:

$$N(k_i) = N$$

The program may adjust the N+I for each subcarrier set $k_i$ when the interference of the CRS of the $m^{th}$ dominant cell collides with the set $k_i$ and the corresponding CRS interference was cancelled. For each subcarrier set $k_i$ the IIM check if the pilots of each cell m collide with that subcarrier set. When there is no collision the interference plus noise of that set N(k) does not have to be adjusted. When there is a collision the interference plus noise of that set N(k) has to be adjusted by removing the power contribution $E_m$ of that cell by applying the correction:

$$N(k_i) = N(k_i) - E_m$$

The algorithm loops over all considered cells M and when all adjustments are done to $N(k_i)$ for subcarrier set $k_i$ the program provides the adjusted $N(k_i)$ output and exits the m loop. The algorithm then resets m to zero and goes to the next subcarrier set $k_i$ to perform the same algorithm as above until all $N(k_i)$ may be adjusted.

By performing the above, the IIM can provide post IC SINR expressions $\gamma_{k_i}'$ for each subcarrier set $k_i$ simply by calculating expressions (8).

$$\gamma_{k_i}' = \frac{E_s}{N(k_i)} \tag{8}$$

Having calculated all $N(k_i)$ the IIM can also provide an average post IC $N_0$+I that can be used to calculate an accurate average post IC SINR expression $\bar{\gamma}'$. This can be done by providing a weighted average of the $N(k_i)$ expression and as weights using the occupation ratio $w_{k_i} = N_{sc,k_i}/N_{sc}$ of the number of subcarriers $N_{sc,k_i}$ of each subcarrier set over the total number of subcarriers $N_{sc}$ over, e.g., a TTI or a smaller time unit where the resource element structure repeats (e.g. in LTE the time unit may be a slot). The time unit may be given by expression (9).

$$\bar{\gamma}' = \sum_{l=0}^{L-1}\sum_{k=0}^{F-1} \frac{E_s}{(N_0 + I)_{k,l}} = E_s \cdot \sum_{k_i=0}^{K-1} \frac{1}{w_{k_i} \cdot N(k_i)} = N_{sc} \cdot E_s \cdot \sum_{k_i=0}^{K-1} \frac{1}{N_{sc,k_i} \cdot N(k_i)} \tag{9}$$

In an example, for LTE and considering a single slot (half TTI) and for a single antenna port (calculations of more antenna ports can follow the same logic) Table 2 provides $N_{sc}$ and $N_{sc,k_i}$ in combination with the structure shown in Table 1.

TABLE 2

Numbers that represent the total number of subcarriers and the number of subcarriers occupied by each subcarrier set within an LTE slot when considering a single antenna port.

| | $N_{sc}$ | $N_{sc, k_0}$, $N_{sc, k_1}$, $N_{sc, k_2}$, $N_{sc, k_3}$, $N_{sc, k_4}$, $N_{sc, k_5}$ | $N_{sc, k_6}$ |
|---|---|---|---|
| Number of subcarriers | 12 × 7 = 84 | 4 | 12 × 5 = 60 |

An example embodiment of the present disclosure presents a simple and efficient approach to solve the defined interference imbalance issue in an OFDM receiver applying an IC algorithm. By applying the concept of the interference imbalance manager, the UE may provide accurate SINR estimates for each subcarrier, or a set of subcarriers in order to fully exploit the advantages of the interference reduction that the IC algorithm provides in terms of demodulation performance and CSI, RLM, and RMM measurement accuracy.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for an interference imbalance manager (IIM), the method comprising:
   an outer loop that goes over the K subcarrier sets k and an inner loop that goes over the M dominant intra-frequency cells that IC are performed on;
   for each subcarrier set k the noise plus interference power estimate of that set is initialized by N by setting: $N(k_i)=N$;
   for each subcarrier set $k_i$ the IIM determine when the pilots of each cell m collide with that subcarrier set;
   when there is no collision, the interference plus noise of that set $N(k_i)$ is not adjusted;
   when there is a collision the interference plus noise of that set $N(k_i)$ is adjusted by removing the power contribution $E_m$ of that cell by applying the correction: $N(k_i)=N(k_i)-E_m$; and
   looping over all considered cells M and when all adjustments are complete to $N(k_i)$ for subcarrier set $k_i$ the program provides the adjusted $N(k_i)$ output and exits the m loop.

2. The method of claim 1, further comprising resetting a counter to zero and repeating the steps of claim 1 for a next subcarrier set $k_i$ until all $N(k_i)$ are adjusted.

3. The method of claim 1, further comprising, when the IC has been applied prior to the $N_0+I$ estimator, adding back to the interference plus noise estimate N calculated on the subcarrier set carrying the serving cell pilots any removed interference power due to the application of IC.

4. The method of claim 3, further comprising performing one program loop over the M dominant intra-frequency cells that IC was performed.

5. The method of claim 4, wherein, before entering the loop, the algorithm has access to the output N which is the noise plus interference estimate provided by the $N_0+I$ estimator.

6. The method of claim 5, wherein, when entering the m loop the algorithm checks if the pilots of cell m collide with the serving cell pilots.

7. The method of claim 6, wherein, for LTE checking if the following condition is true:

$$v_{shift,s}=v_{shift,m}.$$

8. The method of claim 3, wherein s indicates the serving cell and $v_{shift}$ is given by $v_{shift}=N_{ID}^{cell} \bmod 6$ which defines the frequency position of each cell's CRS pilots.

9. The method of claim 3, wherein, when the pilots do not collide then interference of the pilots of cell m was not removed and N is not adjusted.

10. The method of claim 3, wherein, when the pilots collide then interference of the pilots of cell m is removed from N and power needs to be added back by applying the correction: $N=N+E_m$.

11. The method of claim 1, wherein the algorithm loops over all considered cells M and when all adjustments are done the program exits.

* * * * *